United States Patent
Levin et al.

(10) Patent No.: US 11,997,110 B2
(45) Date of Patent: May 28, 2024

(54) TREE-BASED LEARNING OF APPLICATION PROGRAMMING INTERFACE SPECIFICATION

(71) Applicant: Palo Alto Networks, Inc., Santa Clara, CA (US)

(72) Inventors: Liron Levin, Kefar Sava (IL); Isaac Schnitzer, Ra'anana (IL); Elad Shuster, Petach Tikva (IL); Pavel Novik, Ashdod (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 248 days.

(21) Appl. No.: 17/443,316

(22) Filed: Jul. 23, 2021

(65) Prior Publication Data

US 2023/0025896 A1 Jan. 26, 2023

(51) Int. Cl.
*G06F 21/00* (2013.01)
*G06F 16/901* (2019.01)
*H04L 9/40* (2022.01)
*H04L 67/133* (2022.01)
*H04L 69/22* (2022.01)

(52) U.S. Cl.
CPC ...... *H04L 63/1408* (2013.01); *G06F 16/9027* (2019.01); *H04L 67/133* (2022.05); *H04L 69/22* (2013.01)

(58) Field of Classification Search
CPC ... H04L 63/1408; H04L 67/133; H04L 69/22; H04L 63/1416; H04L 63/0236; H04L 63/0245; H04L 67/02; H04L 63/0263; G06F 16/9027
See application file for complete search history.

(56) References Cited

U.S. PATENT DOCUMENTS

| 9,667,704 | B1 * | 5/2017 | Sonawane | H04L 67/63 |
| 10,873,618 | B1 * | 12/2020 | Mittal | H04L 69/22 |
| 2016/0337388 | A1 | 11/2016 | Hu et al. | |
| 2017/0134407 | A1 * | 5/2017 | Mason | H04L 63/1416 |

(Continued)

FOREIGN PATENT DOCUMENTS

| CN | 106713318 A * | 5/2017 | H04L 63/0236 |
| WO | 2021141656 A1 | 7/2021 | |

OTHER PUBLICATIONS

Bae, et al., "SAFEWAPI:Web API Misuse Detector for Web Applications", ACM, FSE 2014: Proceedings of the 22nd ACM SIGSOFT International Symposium on Foundations of Software Engineering, Nov. 11, 2014, pp. 507-517.

(Continued)

*Primary Examiner* — Michael M Lee
(74) *Attorney, Agent, or Firm* — Gilliam IP PLLC

(57) ABSTRACT

A cybersecurity appliance monitoring application traffic to a web application programming interface (API) dynamically updates tree structures for the web API using the application traffic. An API tree generator generates batches of API trees from paths indicated in the application traffic. An API tree merger/pruner updates the generated batches of API trees with various merging, pruning, compacting, and malicious detection operations on the generated batches of API trees. The cybersecurity appliance implements the updated API trees with an API agent that filters the application traffic prior to processing by the web API.

20 Claims, 8 Drawing Sheets

(56) References Cited

U.S. PATENT DOCUMENTS

| | | | | |
|---|---|---|---|---|
| 2017/0359237 | A1* | 12/2017 | Hao | G06F 21/44 |
| 2018/0196643 | A1* | 7/2018 | Dolby | H04L 67/025 |
| 2018/0227315 | A1* | 8/2018 | Taneja | H04L 63/1408 |
| 2018/0338015 | A1* | 11/2018 | Wang | H04L 67/5681 |
| 2020/0364033 | A1* | 11/2020 | Lester | G06F 9/54 |
| 2021/0173728 | A1 | 6/2021 | Treadway | |
| 2021/0211486 | A1* | 7/2021 | Mittal | G06F 16/221 |

OTHER PUBLICATIONS

Suter, et al., "Inferring Web API Descriptions from Usage Data", IEEE, 2015 Third IEEE Workshop on Hot Topics in Web Systems and Technologies, Conference date Nov. 12-13, 2015, Washington, DC, Jan. 7, 2016, pp. 7-12.

Wittern, et al., "Statically Checking Web API Requests in JavaScript", ACM, ICSE '17: Proceedings of the 39th International Conference on Software Engineering, May 20, 2017, pp. 244-254.

EP Application No. 22186521.5, Extended European Search Report dated Dec. 19, 2022, 8 pages.

\* cited by examiner

TREE-BASED LEARNING OF APPLICATION PROGRAMMING INTERFACE SPECIFICATION

BACKGROUND

The disclosure generally relates to information security and packet filtering.

Application programming interfaces (APIs) comprise interfaces for applications to an external source (e.g., a database, network endpoint, user, the World Wide Web, etc.). Typically used to refer to web APIs as an interface between an application and a web server, APIs can alternatively refer to other application interfaces such as interfaces between operating systems and users, interfaces between remote users and a network, interfaces between users and a software library, etc. APIs can be public or private, and web APIs are typically held private to deter malicious attackers from exploiting knowledge of an API to launch a malicious attack via malicious function calls to the API. Web APIs are commonly representational state transfer (REST) APIs that operate on Hypertext Transfer Protocol (HTTP) methods. REST APIs typically use Uniform Resource Identifiers (URIs) that uniquely identify resources. A resource, in the context of a REST API, is an abstraction of information such as a web site, a server, an endpoint, etc. and has a state that can change based on HTTP methods. Resources can contain indicators therein that are interactable by API requests that allow transfer between resources. For instance, a resource can be a HyperText Markup Language (HTML) file and invoking an HTTP GET request that identifies a URI for the HTML file and a Hypertext REFerence (href) attribute in the HTML file (e.g., via a graphical user interface). In this example, the HTTP GET request returns a different resource (i.e., a different HTML file corresponding to the href attribute) and the state of the original HTML file remains unchanged, whereas for an HTTP POST request the state of the original HTML file can change (e.g., by updating content in the HTML file).

API specifications (e.g., OpenAPI/the Swagger specification) comprise interface files for implementing and visualizing APIs. For instance, an interface file can be a JavaScript Object Notation (JSON) file that specifies formats for valid requests to the API in a tree structure. The API specifications describe how a request to the API is handled and, thus, can be used to enhance API security by limiting incorrect or insecure request formats. These incorrect or insecure request formats can be identified by directly analyzing the API specification and once identified, a firewall can throttle traffic having such formats that would otherwise be deemed allowable by the API.

BRIEF DESCRIPTION OF THE DRAWINGS

Aspects of the disclosure may be better understood by referencing the accompanying drawings.

DESCRIPTION

Figure 1:
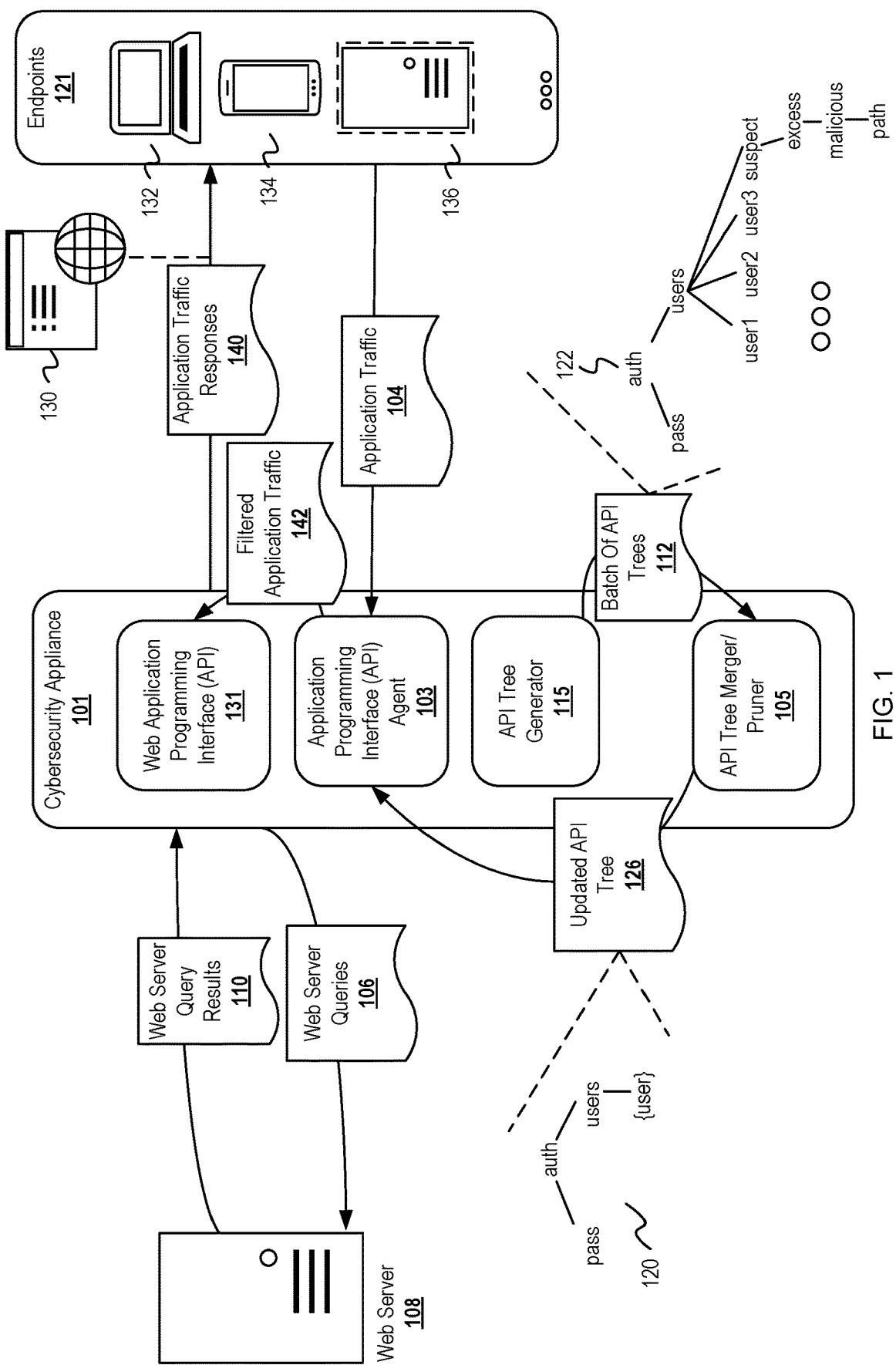
FIG. 1 is a schematic diagram of an example system for dynamically generating and updating API trees using tree merging/pruning from application traffic.

The description that follows includes example systems, methods, techniques, and program flows that embody aspects of the disclosure. However, it is understood that this disclosure may be practiced without these specific details. For instance, this disclosure refers to updating web APIs for communication between devices and a web server by merging, pruning, and compacting batches of API trees from application traffic in illustrative examples. Aspects of this disclosure can be also applied to other application APIs such as software-software interfaces, software-hardware interfaces, or any other interface for application traffic. In other instances, well-known instruction instances, protocols, structures and techniques have not been shown in detail in order not to obfuscate the description.

Overview

Software developers are often privy to details for a software API without explicitly documenting or communicating the exact details of the API specification. The disjunction between persona that manage software security and developers of the software itself leads to error prone API specifications that allow malicious actors to exploit API requests that attack and/or overload a web server receiving application traffic. The present disclosure provides an automated, low-overhead framework for automatically generating trees representing API specifications from application traffic and using the API trees to block malicious and incorrect API requests. A cybersecurity appliance collects application traffic comprising requests to the software API. An API agent filters requests to the API in the application traffic not indicated in API trees representing a specification for the API. Simultaneous and in parallel to operation of the API agent, an API tree generator uses the application traffic to generate batches of API trees using paths in the application traffic. An API tree merger/pruner performs various compacting, pruning, merging, and malicious identification steps to the batches of API trees and merges the resulting API trees with the existing API tree for the application on the API agent to perform dynamic updates as application traffic is received. The compaction/pruning, merging, and malicious identification heuristics are efficient and tailored specific to known behavior for a given application's traffic, resulting in high-quality automated trees for API specifications with low rates of malicious branches. Moreover, the manageable size of the API trees allows for a low-overhead framework for maintaining high-quality API trees using efficient heuristics while filtering potentially high-volume application traffic.

Terminology

The term "node" as used herein refers to a data structure element of a hierarchical data structure. Nodes of API trees herein refer to a node of an API tree within the tree structure, the label of the node, and, in some embodiments, content (e.g., metadata such as headers or query parameters) stored at the node not contained in the label. The use of "representative node" herein, denoted by left and right braces on the node label (e.g., "{user}"), refers to a node comprising a list of nodes as well as corresponding labels and content for each node in the list. Representative nodes are used to improve memory efficiency and traversal of API trees by enabling a compact representation of the API tree containing paths corresponding to all of the nodes in the list of nodes.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 is a schematic diagram of an example system for dynamically generating API tress from application traffic and updating the API trees using tree merging/pruning. Endpoints 121 interact with a web server 108 via a cybersecurity appliance 101. The endpoints 121 interact with the web server 108 to access a software application hosted on the web server 108. Application traffic 104 between the endpoints 121 and the cybersecurity appliance 101 corresponds to the interactions. An API agent 103 on the cybersecurity appliance 101 receives and filters the application traffic 104 based on stored API trees and communicates filtered application traffic 142 to a web API 131. The web API 131 processes API requests in the filtered application traffic 142 to generate web server queries 106 that the cybersecurity appliance 101 communicates to the web server 108. The cybersecurity appliance 101 receives web server query results 110 from the web server 108 and communicates the web server query results 110 in application traffic responses 140 to the endpoints 121.

Parallel to web communications of application traffic 104 to the cybersecurity appliance 101, an API tree generator 115 running on the cybersecurity appliance 101 receives batches of application traffic in the application traffic 104 and uses them to generate a batch of API trees 112. An API tree merger/pruner 105 on the cybersecurity appliance 101 receives the batches of API trees 112 and performs various merging, pruning, and malicious identification operations to generate updated API trees 126 that the API tree merger/pruner 105 communicates to the API agent 103 to implement in-line for filtering incoming application traffic 104. The batches of application traffic used to generate the batch of API trees 112 can be collected in periodic intervals according to a schedule (e.g., every hour). Alternatively, traffic in the application traffic 104 can be collected in local memory by the cybersecurity appliance 101 and used by the API tree generator 115 to generate the batch of API trees 112 until a threshold number of trees or tree size (e.g., number of nodes) is satisfied. A combination of time intervals and size of the batch of API trees 112 can be implemented as traffic collection parameters.

The endpoints 121 can be a collection of endpoints on a closed network, can be a collection of devices across an internet of things, can be a single device, etc. that are all running a web-based application (e.g., via a web browser). Example endpoints 132, 134, and 136 comprise a personal computer, a mobile phone, and a virtual server, respectively. The application can be running on the endpoints 121 or can be accessible by a standardized web interface such as a web browser and can have different types of communications with different types of devices. For instance, the application can provide a graphical user interface (GUI) on a personal device to allow a user to access application functionality. Based on user choices or indications on the GUI, the personal device can communicate queries to servers or databases as API requests for desired information are stored at/by the web server 108. The application can launch processes across resources hosted by the web server 108 based on communications and/or user choices that can, in-turn, prompt the application running on separate resources. The application traffic 104 refers specifically to application traffic comprising API requests to web servers as opposed to local queries for information stored on the endpoints 121 or threads of processes running across devices in the endpoints 121. An example web interface 130 illustrates a web browser that can be used as an interface by any of the endpoints 121 through which to generate the application traffic 104 to the cybersecurity appliance 101. The format of the example web interface 130 (e.g., a webpage) can be communicated by the web server query results 110 in response to HTTP GET requests in the application traffic 104.

The cybersecurity appliance 101 can be any appliance configured to monitor communications between the web server 108 and endpoints 121. The cybersecurity appliance 101 can comprise one or more firewalls that check for malicious behavior in the application traffic 104 using any combination of analytics, machine learning models, stored behavioral signatures, etc. The cybersecurity appliance 101 is trained on network traffic for the application running on the web server 108 or across multiple applications running on multiple web servers including the web server 108 to detect various types of malicious attacks within application traffic such as domain name system (DNS) tunneling, zero-day exploits, Structured Query Language (SQL) attacks, etc.

When the application running on the endpoints 121 is initially implemented, the cybersecurity appliance 101 can throttle application traffic 104 from reaching the web server 108 until a sufficient API tree that efficiently represents an API specification for the web API 131 is generated by the API tree generator 115 or a separate component configured to make an initial API tree for the API agent 103. For instance, the cybersecurity appliance 101 can throttle application traffic 104 until a sufficient amount of traffic is processed for API tree generation and then can use the API tree generator 115 and API tree merger/pruner 105 to generate an initial API tree to run on the cybersecurity appliance 101. Alternatively, the cybersecurity appliance 101 can collect throttled application traffic 104 and send it to the API tree generator 115 until a sufficient number of trees and/or paths are generated so that the cybersecurity appliance 101 is confident that the API tree merger/pruner 105 will generate an accurate initial API tree.

The web API 131 generates web server queries 106 using fields contained in the application traffic 104 for the API defined for the application. For instance, the web server queries 106 can correspond to HTTP GET requests for a URI hosted by the web server 108. The application traffic 104 can contain fields such as a URI, a protocol, a web server path, a host, a user-agent, an accept-language, and accept-encoding, etc. The web API 131 can determine whether the application traffic 104 is in a valid format according to a definition of structure indicated in an Extensible Markup Language (XML) or JavaScript Object Notation (JSON) file to determine whether to generate a corresponding query in the web server queries 106 or to send an error message to an endpoint in the endpoints 121 that communicated the traffic to the cybersecurity appliance 101 in the application traffic 104. The web API 131 further comprises an index, a representational mapping, or an otherwise parsing component to generate queries in the web server queries 106 that correspond to API requests in the filtered application traffic 142. For instance, the web API 131 can contain an index of URIs for resources managed by the web server 108 and corresponding syntax for querying the web servers based on a type of HTTP request (i.e., an index that maps fields in the HTTP request to parameters in a query).

The web API 131 can implement a RESTful API that maintains states of resources indexed by URI and hosted by the web server 108 based on the web server query results 110 (e.g., updating an HTML, file for a webpage based on a HTTP POST request). The web API 131 can maintain a tree structure corresponding to the RESTful API as an API specification (e.g., OpenAPI Specification) to guide processing queries, to aid in visualization and/or documentation of the API, and to communicate to the API agent 103 to facilitate API security by filtering application traffic 104 that doesn't adhere to the tree structure. The tree structure can be dynamically updated based on the application traffic 104. The web server 108 is an abstraction of a host of resources for a RESTful API that can include web pages, endpoints, databases, etc. The web API 131 and API agent 103 can maintain and update a common tree structure as a representation of a specification for the web API 131.

To exemplify filtering of traffic by the API agent 103, consider an example updated API tree 120 that represents a specification for the web API 131. This tree comprises a root node labelled auth, two sub-nodes of the root node labelled pass and users, and one representative sub-node of users labelled {user}. An API request in the application traffic 104 can comprise a field for a website URI and a user ID. The API agent 103 can subsequently determine whether to authorize the packet by identifying that the packet contains a user field, following the user sub-node of auth, and then searching the representative list of users in {user} for the user ID in the packet. If the user ID is present as a node label in the representative node {user} and content (if present) for the user ID in the packet matches content stored at the node, the API agent 103 can forward the corresponding API request to the web API 131. The web API 131 can generate a query for the API request to include in the web server queries 106.

In response to receiving authorized/formatted queries in the web server queries 106 from the cybersecurity appliance 101, the web server 108 communicates web server query results 110 to the cybersecurity appliance 101 that the cybersecurity appliance 101 includes in application traffic responses 140 that it communicates back to the endpoints 121. The cybersecurity appliance 101 can include security policies for detecting malicious behavior in both incoming application traffic 104 and outgoing application traffic responses 140 (e.g., by throttling application traffic responses 140 before they reach the endpoints 121 when malicious behavior is detected).

As more and more batches of the application traffic 104 are received by the cybersecurity appliance 101, these batches of traffic can be stored in local memory and used to dynamically update tree structures used by the API agent 103 when filtering the application traffic 104. The API tree generator 115 receives batches of application traffic 104 in parallel to the API agent 103 and generates trees from paths indicated in the batches of application traffic 104. The paths can be indicated in various ways depending on the configuration of the API agent 103. For instance, in some embodiments application traffic 104 can comprise strings of the form "a/b/c/d/ . . . " wherein each character and/or string after each forward slash is a sequential sub-node in the tree structure generated by the API tree generator 115. The API tree generator 115 can store the number of duplicate paths at each node in the path as they are received. For instance, when a path "a/b/c/d/" is received 4 times but a path "a/b/c/d/e" is received 5 times, then the multiplicity is stored as an integer 4 at the d node in the tree structure and an integer 5 at the e node in the tree structure (i.e., the number of paths previously seen up to the current node is stored as an integer at that node). In some embodiments, the application traffic can further indicate content at each node in a path. The API tree generator 115 can store multiplicity of paths that have the same content at the root node (and/or each subsequent node) for merging. For instance, the API tree generator 115 can receive 15 HTTP requests for website URI "example.url" and can store multiplicity 15 at a corresponding node for website URI. The multiplicity can further indicate which content had that multiplicity (e.g., "15, example.url") in embodiments where multiple website URIs are received multiple times. Because distinct paths with no intersecting nodes can be communicated in the application traffic 104, the tree structure stored and/or generated by any of the API agent 103, API tree generator 115, and API tree merger/pruner 105 can be a forest structure with multiple sub-trees. The cybersecurity appliance 101 uses traffic in application traffic 104 that generates queries having responses from the web server 108 to provide to the API tree generator 115.

The content indicated for nodes (e.g., fields) in the application traffic 104 can correspond to, for HTTP GET requests, query parameters for HTTP fields, wherein the names of the paths indicate field identifiers (e.g., 'user-agent', 'website URI', etc.) for HTTP request fields as well as, in some embodiments, types for field identifiers (e.g., integer, string, etc.). The API tree generator 115 and API agent 103 can be configured to parse packets in the application traffic 104 to separate metadata from field identifiers when generating paths to verify against tree structures and generate tree structures. As an example, fields can be separated from metadata by colons and field/metadata pairs can be separated by commas:

"website URI:mywebsite.com,user-agent:me"

The syntax of packets in the application traffic 104 can be communicated to the API agent 103 by developers of the application or can be automatically detected by the cybersecurity appliance 101 using predictive modeling.

The batch of API trees 112 includes an example API tree 122. The example API tree 122 comprises a root node auth, two sub-nodes pass and users of auth, four sub-nodes user1, user2, user3, and suspect of user, a sub-node excess of suspect, a sub-node malicious of suspect, and a sub-node path of malicious. As suggested by the respective label identifiers, the sub-path of "suspect/excess/malicious/path" is generated by a malicious actor on the endpoints 121 and can, if implemented by the API agent 103, allow both excessively long and possibly malicious traffic in the application traffic 104 that can be used to perpetrate any number of attacks (e.g., by overloading the cybersecurity appliance 101 with application packets having long paths). Each tree in the batch of API trees 112 can be generated from packets for a single Internet Protocol (IP) address or a set of IP addresses from a known subset of clients. Separating trees by IP address helps for malicious detection both by eliminating trees altogether and by identifying malicious paths in trees and inferring malicious behavior by the IP address or set of IP addresses. Trees in the batch of API trees 112 can additionally be generated from traffic from IP addresses grouped based on cookies, metadata, geographical regions, etc.

The API tree merger/pruner 105 receives the batch of API trees 112 and performs a combination of tree compacting, pruning, merging, and malicious filtering operations to generate the updated API trees 126. The batch of API trees 112 includes the current API trees implemented by the API agent 103 and can be communicated by the API agent 103 to the API tree generator 115 when an update is prompted. An example updated API tree 120 is generated using the aforementioned operations from the example API tree 122. Although the various compacting, pruning, merging, and malicious filtering operations can be performed in any order and specific operations can be performed multiple times, an example sequence of operations performed by the API tree merger/pruner 105 to generate the example updated API tree 120 from the example API tree 122 is the following.

First, the API tree merger/pruner 105 detects malicious paths in the example API tree 122. For the depicted example, the API tree merger/pruner 105 detects the path "auth/users/suspect/excess/malicious/path" and prunes it. The API tree merger/pruner 105 can detect this malicious path based on path length (e.g., length above a threshold length, length above a percentile of all previously seen path lengths, etc.) or can search all tree paths for indications or markers corresponding to malicious behavior. The path can be classified as malicious by a malicious detection model (e.g., a neural network) trained on known malicious paths, can be flagged by a database of known malicious paths or known malicious identifiers within paths, can be classified as malicious by a signature database that tracks known behavior of malicious actors, etc. The API tree merger/pruner 105 can additionally analyze metadata (e.g., packet content) stored at any of the nodes of the example API tree 122 to detect malicious behavior using models trained on corresponding metadata for malicious traffic. As an additional step to malicious detection, the API tree merger/pruner 105 can identify an IP address or set of IP addresses that generated the example API tree 122 as malicious and can discard the tree altogether as well as previous API trees generated from a same source.

Next, the API tree merger/pruner 105 determines whether to prune any branches from the example API tree 122. The API tree merger/pruner 105 can have a hard-coded set of rules that paths must follow to be acceptable for the API stored on the cybersecurity appliance 101. The set of rules can be that paths must have a length below a threshold length, paths below specified sub-trees must have a specific format, etc. and paths not adhering to the set of rules are pruned. This set of rules can be provided to the API tree merger/pruner 105 by a developer of the application. In this instance, the API tree merger/pruner 105 determines that all of the paths of the example API tree 122 satisfy the set of rules once the malicious path is pruned.

Once branches are pruned via malicious detection and pruning, the API tree merger/pruner 105 compacts the example API tree 122. In this operation, the API tree merger/pruner 105 identifies sub-nodes of a single node that satisfy a compacting criterion. For instance, in this example the API tree merger/pruner 105 determines that the sub-nodes user1, user2, and user3 are all valid usernames and can be compacted into a representative node {user}. In other instances, the API tree merger/pruner 105 can determine that all sub-nodes of a single node also have a single common sub-node and can again compact the sub-nodes. To exemplify, if user1, user2, and user3 all have common sub-node preferences, then the sub-tree can be compacted into a path "users/{user}/preferences". In a related example, if user1, user2, and user3 all have a common set of sub-nodes that are valid preferences and the sub-tree can be compacted as a sequence of representative nodes as "users/{user}/{preferences}". Identifying sub-nodes for compacting into a single representative node can be based on a statistical database of common node/sub-node combinations or common node identifiers (e.g., common verbs). Alternatively, the API tree merger/pruner 105 can perform a statistical analysis of words in the sub-nodes to identify similarities for compacting. In some instances, the API tree merger/pruner 105 automatically compacts sub-nodes of a node that are leaf nodes above a threshold number of leaf nodes. All sub-nodes of a node need not be compacted. For instance, if a user's node has sub-nodes user1, user2, user3, and jane_doe, the API tree merger/pruner 105 can identify the similarity between user1, user2, and user3 but not jane_doe and can compact the sub-tree into two paths—"/users/{user}" and "users/jane_doe".

Subsequently, the API tree merger/pruner 105 merges the example API tree 122 with other API trees not depicted according to merging criteria to generate the updated API trees 126. The API tree merger/pruner 105 looks for nodes such that the majority or a high percentage of the batch of API trees 112 have that node with the same content. In this instance, having the same node means having the same path to that node from the root of the tree and having the same content (i.e., metadata) stored at that node. In some embodiments, having the same node can further require that all nodes in a path of the API tree ending in the node as a root node also have the same content. Due to the standardized format of API-based application traffic, content at each node is checked for exact matches. However, for more robust applications approximate matching can be implemented in merging criteria. Approximate matching can comprise applying natural language processing to node labels and/or content to determine that the labels and/or nodes are syntactically similar. Other notions of similarity for approximate matching of possible. Other merging criteria can be combined with a majority rule such as determining whether the node has a number of sub-nodes below a threshold and determining that the node has a sufficient number of appearances in the batch of API trees 112 not accounting for content at the node. For the example updated API tree 120, the API tree merger/pruner 105 determines that each of the auth, pass, users, and {user} nodes occur in a majority of the batch of API trees 112, according to the tree structure, with the same content at each respective node and generates the example updated API tree 120 with only these nodes. The API tree merger/pruner 105 communicates the updated API trees 126 to the API agent 103 which the API agent 103 uses to filter incoming application traffic 104.

Any of the merging, pruning, malicious detection, and compacting operations can be performed in any order by the API tree merger/pruner 105, and individual operations can be performed more than once. Any operations performed at a "node" can alternatively be performed at a representative node. Each representative node stores multiple nodes along with corresponding content at each node. Comparing representative nodes for merging comprises verifying that each node for each of the compared representative nodes has the same set of nodes and the same corresponding content. In some instances, the API tree merger/pruner 105 can instead determine that a subset of nodes at a representative node satisfies the majority rule, in which case the subset of nodes is used in place of the representative node when merging.

FIG. 1 is depicted for a cybersecurity appliance comprising the API agent 103 that filters application traffic to the web API 131. Other types of APIs can be used that monitor any type of application traffic having any communication protocol. The method of dynamically generating and updating API trees in parallel with processing of application traffic disclosed herein can be extended to filter application traffic between any entities and corresponding to any type of API and API specification.

Figure 2:
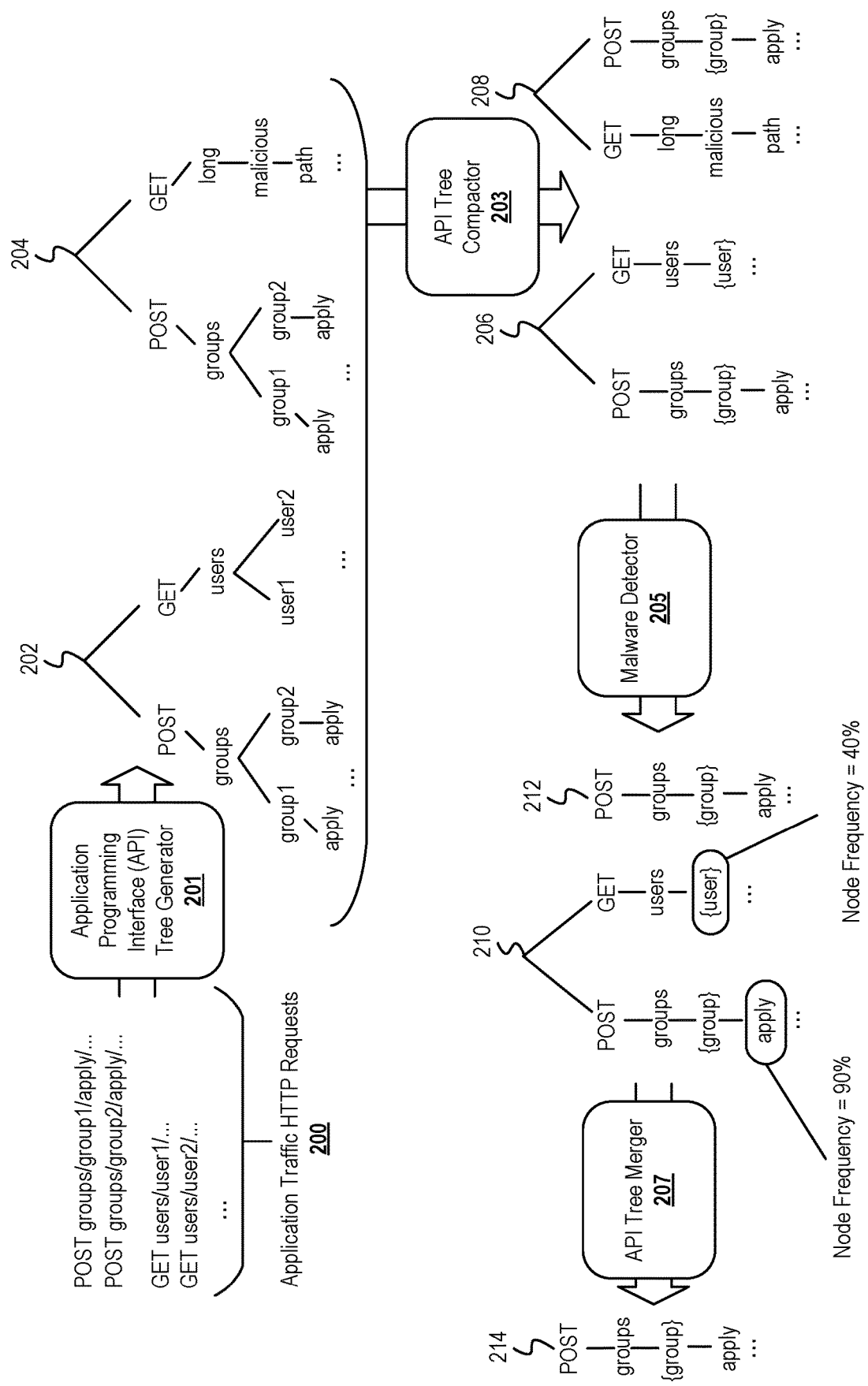
FIG. 2 is an illustrative diagram of an example system for generating merged API trees from application traffic.

FIG. 2 is an illustrative diagram of an example system for generating merged API trees from application traffic. An API tree generator 201 receives application traffic HTTP requests 200. The application traffic HTTP requests include the following GET and POST requests:

POST groups/group1/apply/ . . .
POST groups/group2/apply/ . . .
GET users/user1/ . . .
GET users/user2/ . . .

The API tree generator 201 sorts the application traffic HTTP requests into sets of HTTP requests, each set of HTTP requests corresponding to a distinct API tree. For instance, the API tree generator 201 can identify a set of IP addresses that sent the application traffic HTTP requests 200 and can sort sets of HTTP requests coming from a same IP address or group of IP addresses known to be related (e.g., from a same region or network).

The API tree generator 201 generates example API tree 202 and example API tree 204 from the application traffic HTTP requests 200. In this example, the API tree generator 201 groups the four example HTTP requests into the same set of HTTP requests corresponding to the example API tree 202. The example API tree 202 has sub-nodes POST and GET of an un-labelled root node, sub-node groups of the POST node, sub-nodes group 1 and group 2 of groups, sub-node apply of group 1, sub-node apply of group 2, sub node users of GET, and sub-nodes user1 and user 2 of users. The example API tree 204 has sub-nodes POST and GET of an un-labelled root node, sub-node groups of POST, sub-nodes group 1 and group 2 of groups, sub-node apply of group 1, sub-node apply of group 2, sub-node long of GET, sub-node malicious of long, and sub-node path of malicious.

An API tree compactor 203 compacts the example API trees 202 and 204 to generate example compacted API tree 206 and example compacted API tree 208. Example compacted API tree 206 comprises an un-labelled root node with sub-nodes POST and GET. The POST node has a path of sub-nodes groups, {group}, and apply. The GET node has a path of sub-nodes users and {user}. The example compacted API tree 206 is generated by the API tree compactor 203 from the example API tree 202 by generating representative nodes {group} comprising the list of nodes {group1, group2} and the representative node {user} comprising the list of nodes {user1, user2}. Group1 and group2 are compacted because of the common sub-node apply and common parent node groups, and user1 and user2 are compacted because of the common parent node users. The example compacted API tree 208 was generated from the example API tree 204 and comprises an un-labelled parent node with sub-nodes GET and POST. The GET node has a path of sub-nodes long, malicious, and path. The POST node has a path of sub-nodes groups, {group}, and apply. The API tree compactor 203 determined that none of the subtrees of the GET node in the example API tree 204 need compactification because there is only a single path. Conversely, the {group} representative node was generated from nodes group1 and group2 in the example API tree 204 having common parent node groups and sub-node apply.

The malware detector 205 uses malicious detection to prune the example compacted API trees 206 and 208 to generate example benign API trees 210 and 212, respectively. The malware detector 205 failed to detect any indications of malicious behavior in the example compacted API trees 206 and it is identical to the example benign API tree 210. By contrast, the malware detector 205 detected the malicious path "GET/long/malicious/path . . . " in the example compacted API tree 208 and pruned this path. The example benign API tree 212 comprises the path "POST/groups/{group}/apply . . . ". The malware detector 205 can, for instance, determine that the path in the example compacted API tree 208 is malicious because it is too long, it doesn't follow a set of rules for application APIs, or the malware detector 205 can be trained on malicious API paths/sub-trees to detect malicious sub-trees in API trees.

An API tree merger 207 merges the example benign API trees 210 and 212 to generate an example merged API tree 214 based on common sub-nodes and/or sub-paths in the example benign API trees 210 and 212. The example merged API tree 214 comprises the path "POST/groups/{group}/apply . . . ". The API tree merger 207 determines that the sub-node apply of the example benign API tree 210 has node frequency 90% among all of the API trees to be merged, whereas the example sub-node {user} of the example benign API tree 210 has a node frequency 40%. Using the majority rule for tree merging, the API tree merger 207 determines that nodes in the path "GET/users/{user}" have node frequency below 50% (including content stored at each node) and uses the majority rule to prune this path during merging. Other notions of common paths and/or nodes can be used for merging API trees. For instance, common can mean above a threshold number of occurrences. The occurrence threshold for common paths and/or nodes can depend on the length of a path or the depth of a node (e.g., with longer paths having lower thresholds).

The example API trees in FIG. 2 are depicted with nodes without identifiers. Although these nodes are used as placeholders without corresponding content, each of the API trees in FIG. 2 can alternatively be a forest comprising many trees not having the placeholder nodes. Any of the compacting, malware detection, and merging operations can be applied to individual sub-trees in each of the corresponding forests or to the sub-trees linked by a placeholder root node having no identifier and no content. For instance, when merging, the API tree merger 207 can apply the majority rule by choosing a representative sub-tree from example API trees to be merged that has the desired node (or none, if no such sub-tree exists).

The example operations are described with reference to a cybersecurity appliance, an API agent, and a web API for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
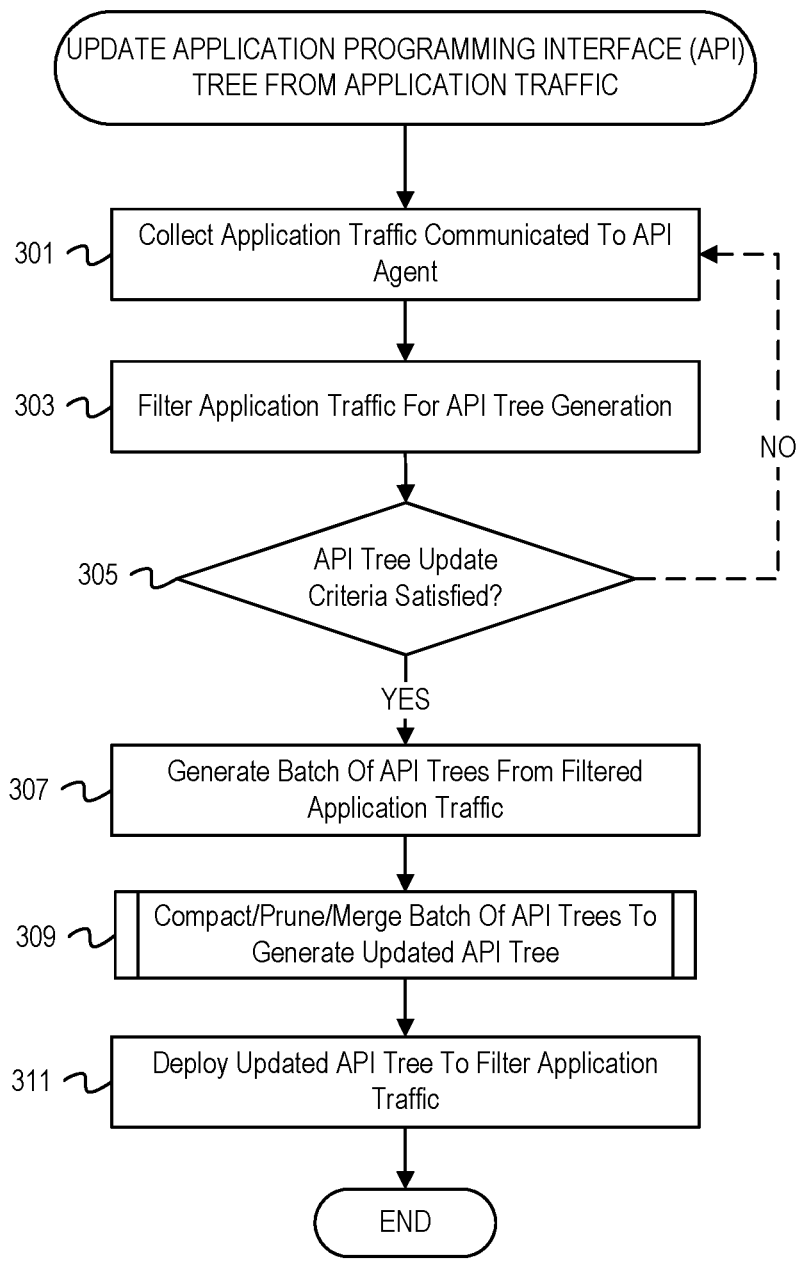
FIG. 3 is a flowchart of example operations for updating an API tree from application traffic.

FIG. 3 is a flowchart of example operations for updating an API tree from application traffic. At block 301, a cybersecurity appliance collects application traffic communicated to an API agent running on the cybersecurity appliance. The application traffic can comprise traffic communicated to the cybersecurity appliance from one or more endpoints via the World Wide Web. The API agent can have an API tree of paths that correspond to valid requests to a web server hosted by the cybersecurity appliance stored in memory. The cybersecurity appliance can, prior to generating an initial API tree to be deployed by the API agent, throttle application traffic to the web server as it collects application traffic. Application traffic can subsequently be evaluated by the API agent once the operations in FIG. 3 are complete.

At block 303, the cybersecurity appliance filters application traffic for API tree generation. The cybersecurity appliance can evaluate one or more security policies evaluated by one or more firewalls running on the cybersecurity appliance to block application traffic from malicious or blocked sources. For instance, a security policy can identify that an IP address sending application traffic is on a block list of IP addresses. The cybersecurity appliance can further analyze payloads within the application traffic to detect behavior from malicious or blocked applications using, for instance, a classification model for application traffic. The cybersecurity appliance filters out any blocked application traffic according to security policies before using the remaining application traffic for API tree generation.

At block 305, the cybersecurity appliance determines whether one or more API tree update criteria are satisfied. The API tree update criteria can be, for instance, that a sufficient number of application traffic has been collected (e.g., based on a threshold of filtered application traffic payloads), a sufficient amount of time has elapsed since a previous API tree update has been performed, a sufficient number of API calls to a corresponding web server or other resource return invalid or empty results, etc. The API tree update criteria can depend on whether an initial API tree has already been deployed on an API agent. Prior to deploying an initial API tree, the cybersecurity appliance can apply an API tree update criterion that an amount of application traffic be collected that satisfies a threshold (e.g., greater than the threshold, greater than or equal to the threshold) for API tree updates. The API tree update criteria can depend on corresponding sources of application traffic as well as the type of application traffic. If the API tree update criteria is satisfied, flow proceeds to block 307. Otherwise, flow returns to block 301. The operations depicted at blocks 301, 303, and 305 can occur in various orders (as indicated by the dotted line connecting blocks 305 and 301) depending on characteristics of incoming application traffic to the API agent. For instance, in some embodiments the cybersecurity appliance checks the API tree update criteria periodically according to a schedule (e.g., every hour). When no application traffic is received in an interval according to the schedule, the operations at blocks 301 and 303 are skipped and only the operation at block 305 is performed.

At block 307, the cybersecurity appliance generates a batch of API trees from the filtered application traffic. The cybersecurity appliance parses the application traffic to extract payloads that indicate paths corresponding to URIs for resources to be accessed and builds the API trees in the batch of API trees based on these paths. For instance, the URI can be a string with the format "a/b/c/d . . . " in an HTTP request and each string separated by a "/" character is a node in the path. Each API tree in the batch of API trees is generated for application traffic from a set of IP addresses that can be grouped, for instance, by network, by region, by corresponding user identifiers such as data stored in cookies, etc. The operations in FIG. 3 depict blocks 301, 303, and 305 occurring in a continuous loop until API tree update criteria are satisfied based on collected and filtered application traffic. The API tree update criteria can alternatively be evaluated subsequent to block 307 and can be based on the generated batch of API trees. The API tree update criteria can further comprise that, for instance, there number of API trees in the batch of API trees is above a threshold number of API trees or that the API trees have a number of nodes above a threshold number of nodes. The batch of API trees is thus continuously updated from collected/filtered application traffic until such an update criterion is satisfied, and this criterion can be combined with a criterion for the amount of collected/filtered application traffic such that multiple update criteria must be satisfied.

At block 309, the cybersecurity appliance compacts, prunes, and merges the batch of API trees to generate an updated API tree. The operations at block 309 are described in greater detail with respect to FIG. 4.

At block 311, the cybersecurity appliance deploys the updated API tree to filter application traffic. The cybersecurity appliance communicates the updated API tree to an API agent running on the cybersecurity appliance. The API agent receives application traffic communicated to the cybersecurity appliance and determines whether the application traffic conforms to the updated API tree provided as an API specification. For instance, the API agent can determine whether to query a hosted web server based on verifying URI paths indicated in the application traffic against the tree structure of the updated API tree including, in some embodiments, verifying metadata at each node in the URI paths such as query parameters and field types.

Figure 4:
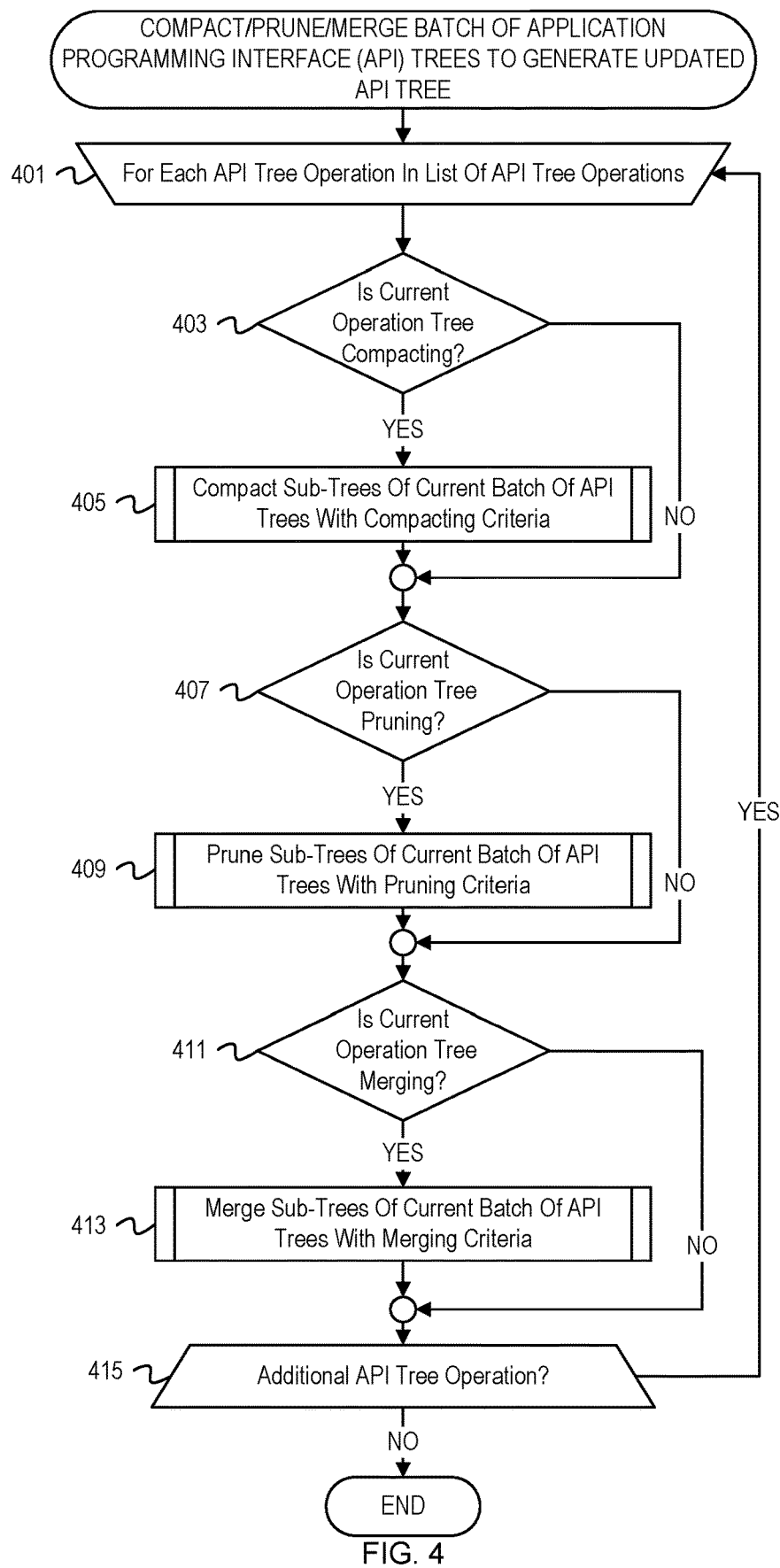
FIG. 4 is a flowchart of example operations for compacting, pruning, and merging a batch of API trees to generate an updated API tree.

FIG. 4 is a flowchart of example operations for compacting, pruning, and merging a batch of API trees to generate an updated API tree. At block 401, a cybersecurity appliance begins iterating through API tree operations in a list of API tree operations. The API tree operations listed herein include compacting, pruning, and merging operations according to respective heuristics. Any API tree operation and any corresponding heuristic can be performed to improve quality of API trees. The ordering of presented operations in FIG. 4 is arbitrary as, at each presented operation, the determination is made whether that operation is the current operation in the list. The list of operations can occur in any order for the API tree operations presented herein and additional operations, and any API tree operation can occur multiple times in the list and with multiple distinct heuristics. The list can be updated and/or otherwise altered by application developers based on known structure of application specifications. The list can additionally be updated based on structure of API trees as they are generated. For instance, in cases of a high rate of malicious or incorrect paths while filtering application traffic with a deployed API agent, the malicious detection operation can be updated to occur multiple times throughout the list of operations. Any subsequent description of API tree operations in FIGS. 5A, 5B, and 6 can vary with respect to heuristics and operational flow. The example operations at each iteration of API tree operations occur at block 403, 405, 407, 409, 411, and 413.

At block 403, the cybersecurity appliance determines whether the current API tree operation is API tree compacting. If the current API tree operation is API tree compacting, flow proceeds to block 405. Otherwise, flow skips to block 407.

At block 405, the cybersecurity appliance compacts sub-trees of the current batch of API trees with one or more compacting criteria. The operations at block 405 are described in greater detail with respect to FIG. 5A.

At block 407, the cybersecurity appliance determines whether the current API tree operation is API tree pruning. If the current API tree operation is API tree pruning, flow proceeds to block 409. Otherwise, flow skips to block 411.

At block 409, the cybersecurity appliance prunes sub-trees of the current batch of API trees with one or more pruning criteria. The operations at block 409 are described in greater detail with respect to FIG. 5B.

At block 411, the cybersecurity appliance determines whether the current API tree operation is API tree merging. If the current API tree operation is API tree merging, flow proceeds to block 413. Otherwise, flow skips to block 415.

At block 413, the cybersecurity appliance merges sub-trees of the current batch of API trees with one or more merging criteria. The operations at block 413 are described in greater detail with respect to FIG. 6.

At block 415, the cybersecurity appliance determines whether there is an additional API tree operation in the list of API tree operations. If there is an additional API tree operation in the list of API tree operations, flow returns to block 401. Otherwise, the operations in FIG. 4 are complete.

Figure 5A:
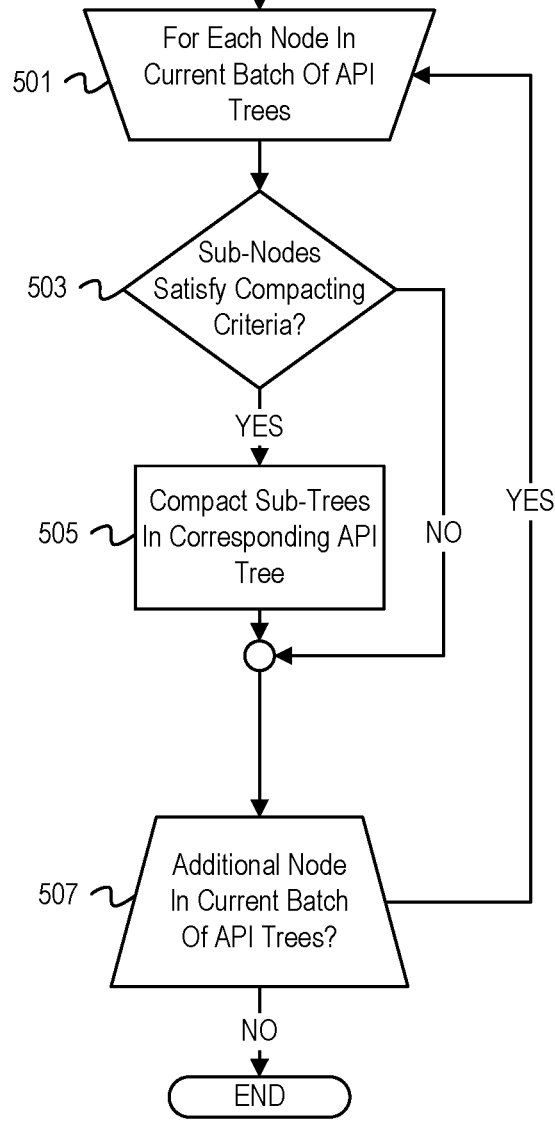
FIG. 5A is a flowchart of example operations for compacting sub-trees of a current batch of API trees with one or more compacting criteria.

FIG. 5A is a flowchart of example operations for compacting sub-trees of a current batch of API trees with one or more compacting criteria. At block 501, a cybersecurity appliance begins iterating through nodes in the current batch of API trees. The cybersecurity appliance can, for instance, iterate through nodes in each API tree in succession, performing one of depth first search (DFS) and breadth first search (BFS) in its' traversal of each API tree. For the purposes of compacting sub-trees, the cybersecurity appliance can initialize BFS at each API tree in the current batch of API trees. Then, at each node the cybersecurity appliance can do a BFS for each child of the current node and determine whether to compact the children at the current node. If the cybersecurity appliance compacts the children at the current node, then it can search the compacted node in all subsequent BFS iterations, saving the computational cost of searching each child node. Other sequences of iterations through nodes of API trees can be performed and can depend on compacting criteria.

At block 503, the cybersecurity appliance determines whether sub-nodes of the current node satisfy one or more compacting criteria. The cybersecurity appliance can maintain a database of common node labels that are associated and can identify sub-nodes of the current node for compacting based on associated node labels. For instance, the cybersecurity appliance can determine that "user1", "user2", and "user3" sub-node labels are associated and can compact these sub-nodes into a compacted node "{user}". In this instance, the compacting criteria is whether the sub-node labels are in a database of associated sub-node labels. The cybersecurity appliance can alternatively use natural language processing on labels for the sub-nodes as well as metadata for the sub-nodes to determine whether sub-nodes should be compacted. For instance, the cybersecurity appliance can embed strings for the sub-node labels in Euclidean space (e.g., Word2Vec) and can determine that the distance between embedded strings is below a threshold or can cluster embedded strings to associate sub-node labels. Thus, the compacting criteria can be that sub-node labels are embedded as sufficiently small clusters or are sufficiently close.

The compacting criteria can additionally comprise whether sub-nodes have identical children. For instance, if the sub-nodes are "user1", "user2", and "user3" all having children "preferences", then the cybersecurity appliance can determine to compact these sub-nodes into a representative node. Any of the aforementioned compacting criteria can be used in combination. If the sub-nodes satisfy the compacting criteria, flow proceeds to block 505. If the sub-nodes do not satisfy the compacting criteria or if there are no sub-nodes, flow skips to block 507.

At block 505, the cybersecurity appliance compacts sub-trees corresponding to sub-nodes satisfying the compacting criterion in the corresponding API tree. The cybersecurity appliance replaces the associated sub-nodes satisfying the compacting criteria with representative nodes. The cybersecurity appliance merges identical paths in sub-trees of the associated sub-nodes and adds any paths that are non-identical. For instance, when merging paths "user1/preferences", "user2/preferences", and "user3/preferences", the path "{user}/preferences" is generated with representative node "{user}" because the paths are identical. If "user1", "user2", and "user3" have distinct sub-paths then all of these paths are added to the API tree.

At block 507, the cybersecurity appliance determines whether there is an additional node in the current batch of API trees. If an additional node is present, flow returns to block 501. Otherwise, the operations in FIG. 5A are complete.

Figure 5B:
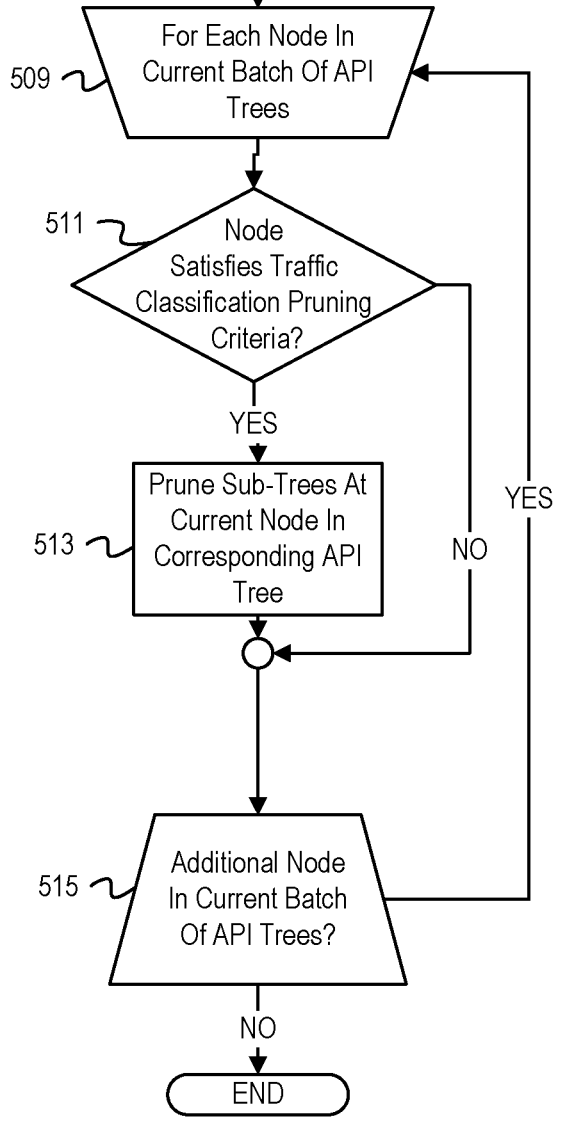
FIG. 5B is a flowchart of example operations for pruning sub-trees of a current batch of API tree with one or more traffic classification pruning criteria.

FIG. 5B is a flowchart of example operations for pruning sub-trees of a current batch of API tree with one or more traffic classification pruning criteria. At block 509, a cybersecurity appliance begins iterating through nodes in the current batch of API trees. The nodes can be iterated in any order. For embodiments where traffic classification pruning criteria involve entire paths, the cybersecurity appliance can perform DFS to reach root nodes of the batch of API trees and then analyze the paths to evaluate all nodes along the path against the traffic classification pruning criteria. Alternatively, iterating through nodes using BFS can save the computational cost of evaluating entire sub-trees when a parent node for the sub-trees is pruned. The example operations at each iteration occur at blocks 511, 513, and 515.

At block 511, the cybersecurity appliance determines whether the current node satisfies the traffic classification pruning criteria. The cybersecurity appliance comprises a malware detector that detects paths corresponding to malicious actors. For instance, the malware detector can be a classification algorithm (e.g., any supervised or unsupervised learning model) trained to detect malicious behavior based on paths extracted from payloads to APIs from malicious actors and paths extracted from payloads of approved API traffic. The malware detector need not be trained only on malicious actors. For instance, the malware detector can be trained to detect paths from application traffic in formats that, while benign, are not approved to access the API. For instance, an API can only accept paths that have an approved format so as to not waste computing resources by unnecessarily querying resources managed by the API. The traffic classification pruning criteria can be that the malware detector classifies the path for the current node in the corresponding API tree as approved or benign.

The cybersecurity appliance can additionally maintain a database or profile of approved formats for API paths. For instance, for a given node label the profile can comprise a list of approved sub-nodes and/or parent nodes for the node label. The traffic classification pruning criteria can thus comprise whether the sub-nodes and parent nodes of the current node fit the format in the profile, in addition or alternative to the aforementioned classification criterion. If the current node satisfies the traffic classification pruning criteria, flow proceeds to block 513. Otherwise, flow skips to block 515.

At block 513, the cybersecurity appliance prunes sub-trees at the current node in the corresponding API tree from the batch of API trees. The cybersecurity appliance prunes the current node and all of its' children from the corresponding API tree. The pruned nodes are thus omitted from future iterations for evaluation of traffic classification pruning criteria.

At block 515, the cybersecurity appliance determines whether there is an additional node in the current batch of API trees. If there is an additional node, flow returns to block 509. Otherwise, the operations in FIG. 5B are complete.

Figure 6:
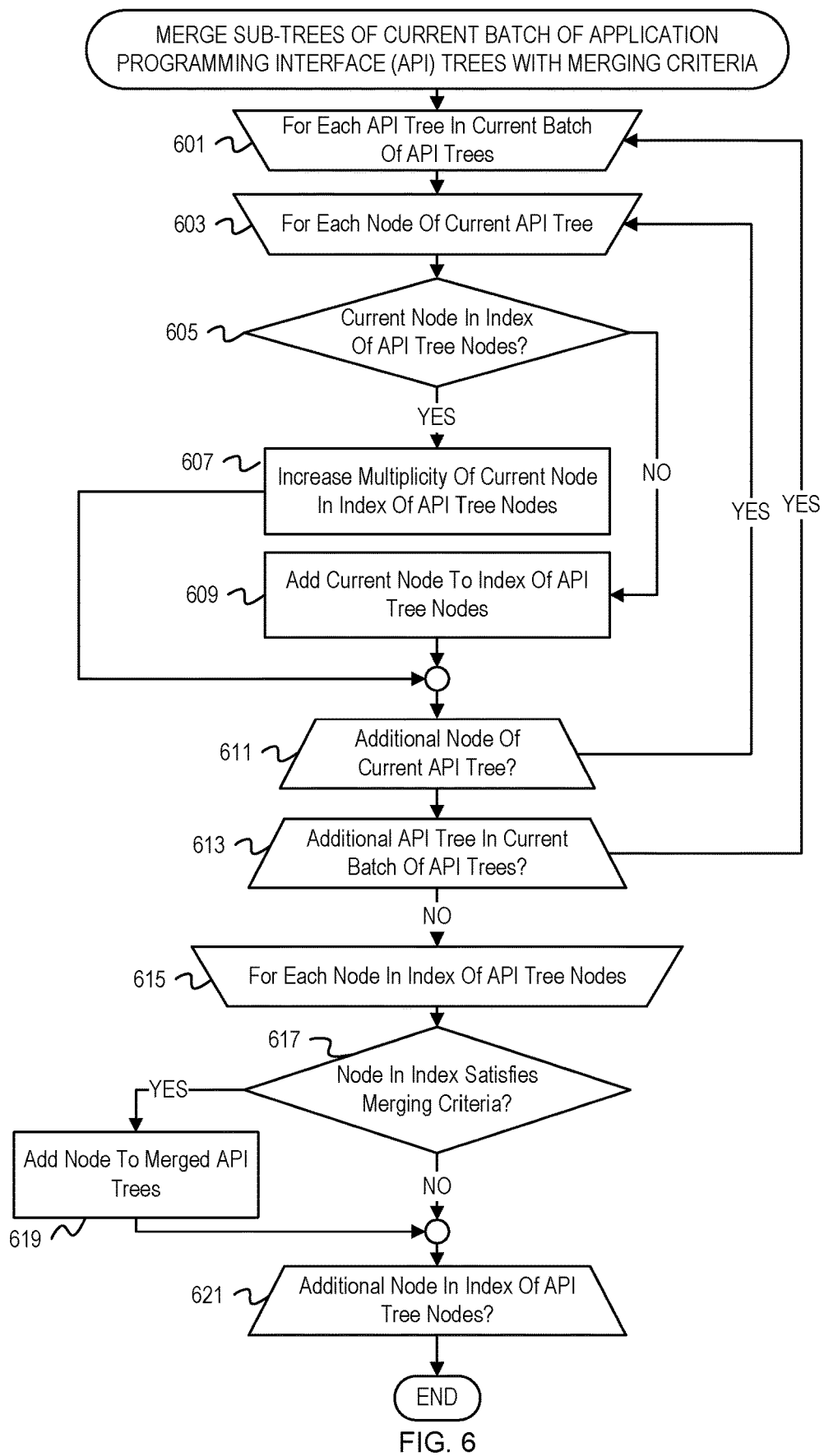
FIG. 6 is a flowchart of example operations for merging sub-trees of a current batch of API trees with one or more merging criteria.

FIG. 6 is a flowchart of example operations for merging sub-trees of a current batch of API trees with one or more merging criteria. At block 601, the cybersecurity appliance begins iterating through API trees in a current batch of API trees. The cybersecurity appliance can iterate through the API trees in any order. The example operations at each iteration occur at blocks 603, 605, 607, 609, and 611.

At block 603, the cybersecurity appliance begins iterating through nodes in the current API tree. The nodes in the current API tree can be iterated in any order, for instance with DFS or BFS. The example operations at each iteration occur at blocks 605, 607, and 609.'

At block 605, the cybersecurity appliance determines whether the current node is in an index of API tree nodes. The index of API tree nodes can comprise a database of previously seen nodes. The database can store node labels, parent node paths and labels, and node metadata for each node. The cybersecurity appliance can verify whether an exact match for the current node according to the data stored in the index is present. If the current node is in the index of API tree nodes, flow proceeds to block 607. Otherwise, flow proceeds to block 609.

At block 607, the cybersecurity appliance increases the multiplicity of the current node in the index of API tree nodes. The cybersecurity appliance can maintain an integer associated with each node (referred to as "multiplicity" herein) that indicates the number of instances of the exact matches of the node occurring in the current batch of API trees. The cybersecurity appliance increments the integer associated with the current node. After the operation in block 607, flow skips to block 611.

At block 609, the cybersecurity appliance adds the current node to the index of API tree nodes. The cybersecurity appliance stores data such as a node label, parent node labels, child node labels, node metadata, etc. along with an initial multiplicity of 1 in the index. Different embodiments can store varying amounts of data for the nodes in the index. The data stored depends on how merging occurs, for instance whether nodes are required to have identical metadata, parent nodes, child nodes, etc. for merging. Flow proceeds to block 611.

At block 611, the cybersecurity appliance determines whether there is an additional node of the current API tree. If an additional node is present, flow returns to block 603. Otherwise, flow proceeds to block 613.

At block 613, the cybersecurity appliance determines whether there is an additional API tree in the current batch of API trees. If there is an additional API tree, flow returns to block 601. Otherwise, flow proceeds to block 615.

At block 615, the cybersecurity appliance begins iterating through nodes in the index of API tree nodes. The cybersecurity appliance additionally initializes an empty forest of merged API trees. The index of API tree nodes can be sorted by length of corresponding paths to nodes (i.e., by depths of nodes) so that nodes at shortest path length are iterated first so as to construct the forest of merged API trees starting at root nodes. The operations at each iteration occur at blocks 617 and 619.

At block 617, the cybersecurity appliance determines whether the current node in the index of API tree nodes satisfied one or more merging criteria. The merging criteria can be, for instance, that the multiplicity of the current node is above a threshold value, or that the multiplicity of the current node occurs with a frequency above a threshold frequency. The use of frequency for multiplicity of nodes refers to the number of occurrences of a node divided by the number of API trees in the batch of API trees, because a node can only occur once in each API tree. In some instances, duplicate paths are generated from identical payloads in application traffic. Deduplication can occur when merging as multiplicity of a node is counted more than once within a single API tree iteration (in which case the multiplicity is counted once for all occurrences of the node within the API tree) or can occur as a preprocessing step prior to API tree operations. If the current node satisfies the merging criteria, flow proceeds to block 619. Otherwise, flow skips to block 621.

At block 619, the cybersecurity appliance adds the node to the merged API trees. The cybersecurity appliance can build the merged API trees with any algorithm for iteratively adding paths to a forest. For instance, the cybersecurity appliance can search for a path corresponding to the path of parent nodes for the current node. If such a path is detected, the cybersecurity appliance can add the current node as a child to the detected path. Otherwise, the cybersecurity appliance can initialize the path within the forest with the current node as the child. If only a part of the path is detected, the cybersecurity appliance can initialize the remainder of the path for the current node.

At block 621, the cybersecurity appliance determines whether there is an additional node in the index of API tree nodes. If there is an additional node, flow returns to block 615. Otherwise, the operations in FIG. 6 are complete.

The operations in FIGS. 5A, 5B, and 6 are depicted as iterating through all nodes of a batch of API trees for each operation. This is for compact presentation of the depicted operations. Evaluation of merging, pruning, compacting, and other operations can occur simultaneously while iterating through nodes. For instance, at a given node, a cybersecurity appliance can determine that the node does not satisfy merging and compacting criteria and can further determine that the node satisfies pruning criteria so that all of the sub-trees of the current node are pruned. The API tree operations are thus not evaluated for any of the pruned nodes while continuing iterations through nodes of the batch of API trees.

Figure 7:
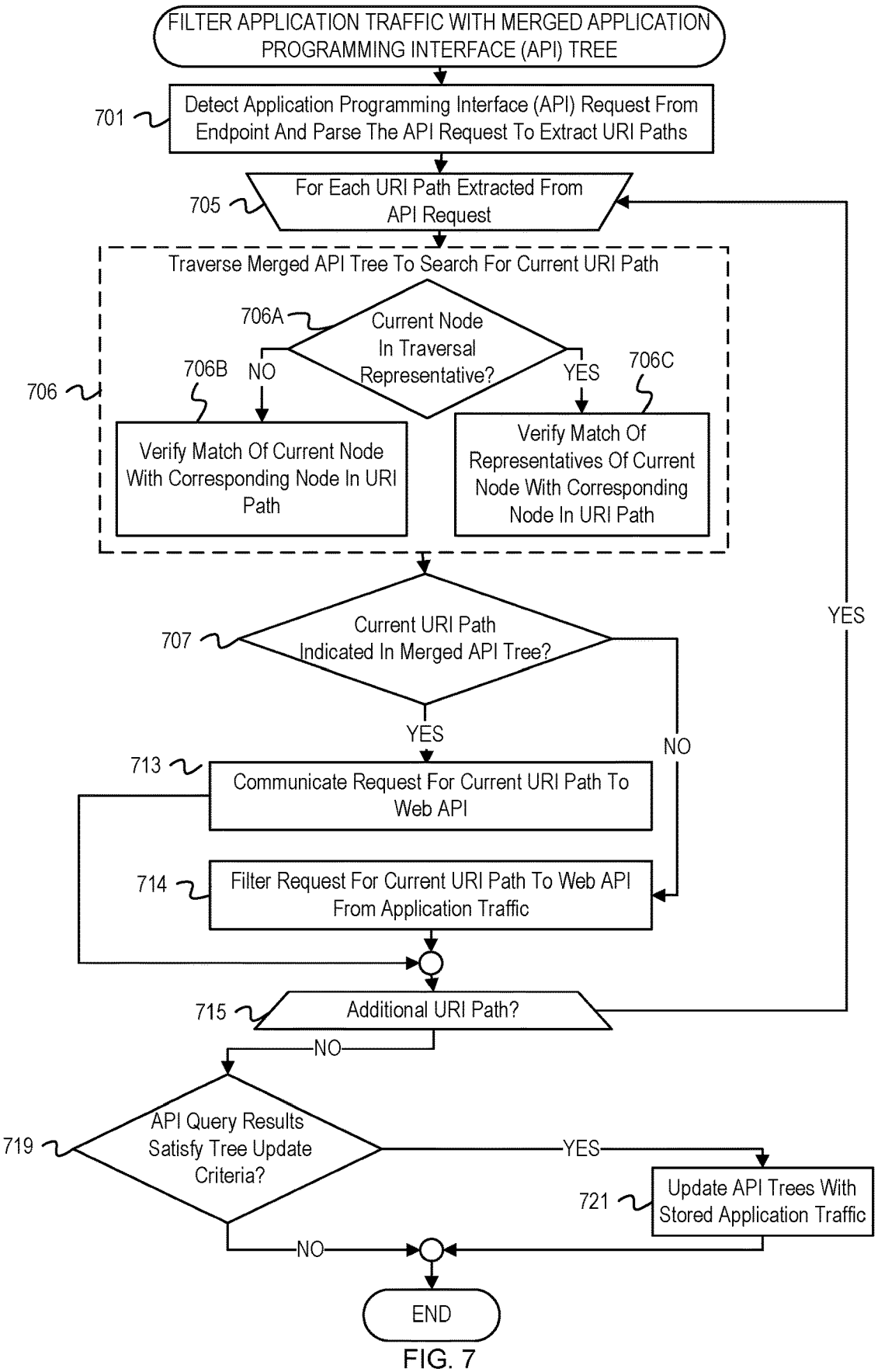
FIG. 7 is a flowchart of example operations for filtering application traffic with merged API trees for an API specification.

FIG. 7 is a flowchart of example operations for filtering application traffic with merged API trees for an API specification. At block 701, a cybersecurity appliance detects an API request and parses the API request to extract URI paths. The cybersecurity appliance lies in a communication path between an endpoint that sends the API request and a server that implements or serves the request. The URI paths extracted by the cybersecurity appliance correspond to one or more resources managed/accessed by the server(s). The API tree comprises paths that indicate valid URI paths for the API specification corresponding to valid resources to be accessed according to a function defined by the API. The URI paths are indicated in the API request. For instance, when the API request is an HTTP GET request, the URI path corresponds to a URL indicated by a string after the "GET" syntax, wherein nodes in the URI path are separated by "/" characters. The cybersecurity appliance can additionally extract metadata from the API request corresponding to each node in the URI path. For instance, HTTP GET requests can further indicate server parameters and protocol types. Each node can correspond to metadata indicated in payloads of API requests that can be stored with each node in the URI paths.

At block 705, an API agent begins iterating through URI paths that represent an API specification. The API trees comprise merged API trees generated by merging, compacting, and pruning operations for API trees generated from URI paths indicated in application traffic previously received by the cybersecurity appliance. The URI paths in FIG. 7 are referred to as comprising nodes. Each node corresponds to an element in the respective URI paths (e.g., as delineated by a "/" character) as well as any additional labels, metadata, etc. indicated in the URI path or corresponding API request for that element. In some embodiments, the API trees are joined by a single parent node with a null or void value that is not used to check URI paths. In these embodiments, there is a single iteration starting at block 705. The example iterations occur at blocks 707, 709, 711, 713, and 714.

At block 706, the API agent traverses the merged API tree to search for the current URI path. The API agent traverses the merged API tree, starting at the root node, and verifies each node in its' traversal against the current URI path. For instance, the API agent can perform a DFS of the tree and, at each depth of the merged API tree, if the corresponding node in the current URI path is not found, the DFS can terminate. Other tree search algorithms such as BFS can be used. At each iteration in the traversal of the merged API tree, the API agent verifies whether the current node in the merged API tree matches the node of corresponding depth in the current URI path. Example operations for matching nodes in the current URI path and nodes in the merged API tree at corresponding depth are depicted as sub blocks 706A, 706B and 706C of block 706 as indicated by the dotted line delineating block 706. These operations can occur at each iteration in the traversal and are example operations for matching that can vary with respect to configurations of API trees and URI paths. As with the example of DFS, failure to match according to these example operations or any other matching operations can exclude nodes for future traversal (e.g., by excluding child nodes if a parent node does not match).

At block 706A, the API agent determines whether a current node in a traversal of the merged API tree is a representative node. Representative nodes can be indicated by syntax in a label for each node such as "{" and "}" characters surrounding the label. If the current node is a representative node, flow for the example sub-operations of block 706 proceeds to block 706C. Otherwise, flow for the example sub-operations of block 706 proceeds to block 706B.

At block 706B, the API agent verifies whether the current node in the traversal of the merged API tree matches the node at corresponding depth in the URI path. Matching nodes in the URI paths and the merged API trees can comprise exact matching of labels for nodes. In some embodiments the current URI path and the current API tree additionally comprise metadata at each node. The API agent can additionally verify that the metadata at the current node exactly matches metadata for the node at corresponding depth in the current URI path. In some embodiments, matching can be similarity-based approximate matching according to a word-based distance (e.g., Word2vec).

At block 706C, the API agent verifies whether a representative of the current node matches a node at corresponding depth in the URI path. The API agent can exactly match the node in the current URI path with, for instance, a list of labels and/or metadata for valid nodes for the representative node. The current node can maintain independent lists of node labels and node metadata or can maintain pairings of labels with corresponding metadata so that a match requires one of the specified pairings. In some embodiments, the API agent can perform natural language processing to determine an approximate match of a representative label for a representative node and a label for the current URI path. For instance, the API agent can determine that a representative node with representative label "user" can match a node in the current URI path with label "user1" based on user1 being indicated in a list of labels for nodes at the representative node "user".

At block 707, the API agent determines whether the URI paths extracted from the current API request are indicated in the merged API tree. The criteria for the current URI path being indicated in the merged API tree can comprise a determination that the API agent matches all of the nodes in a path in the merged tree with the current URI path during its' traversal. In some embodiments, the criteria can further require that the end node of the current URI path has no children in the corresponding path in the merged API tree. If the current URI path is indicated in the merged API tree, flow proceeds to block 713. Otherwise, flow skips to block 714.

At block 713, the API agent communicates a request for the current URI path to the web API. The request for the current URI path comprises fields and/or parameters contained in corresponding application traffic of the original API request specific to resources for the current URI path. For instance, the request can comprise HTTP fields for an HTTP request for the current URI path. In some embodiments, the API agent withholds communication of any portion of the API request until all of the URI paths are verified against the merged API tree (i.e., the operation at block 713 occurs after block 715 for the full API request). Flow skips to block 715.

At block 714, the API agent filters a request for the current URI path to the web API from the application traffic before it is received by the web API. The API agent can selectively filter fields corresponding to the current URI path from the API request to be excluded at future iterations for additional URI paths. In other embodiments, the API agent can block the full API request based on determining that one of the URI paths is not indicated in the merged API tree, and flow can skip to block 719.

At block 715, the cybersecurity appliance determines whether there is an additional URI path representing the API specification. If there is an additional URI path, flow returns to block 705. Otherwise, flow proceeds to block 719.

At block 719, the cybersecurity appliance determines whether received API query results satisfy API tree update criteria. The cybersecurity appliance can monitor API query results as they are communicated to endpoints that generated corresponding API requests and can verify whether the API requests were responsive (e.g., 200-299 HTTP response status codes) or non-response (e.g., 300-599 HTTP response status codes). For the embodiment of HTTP response status codes, 200-299 codes indicate successful responses, 300-

399 codes indicate redirects, 400-499 indicate client errors, and 500-599 indicate server errors. The cybersecurity appliance can maintain a frequency of API query results corresponding to successful API requests. The API tree update criteria can comprise that the frequency of successful API requests is above a threshold frequency (e.g., 90%). If the API tree update criteria are satisfied, flow proceeds to block 721. Otherwise, the operations in FIG. 7 are complete.

At block 721, the cybersecurity appliance updates API trees representing the API specification with stored application traffic. The application traffic can be stored by the cybersecurity appliance in local memory during the preceding operations in FIG. 7. The API trees can be updated by the cybersecurity appliance with any of the previously depicted merging, compacting, and pruning operations with API trees generated from the stored application traffic in addition to the merged API trees for the API specification. The operations in FIG. 7 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations in FIGS. 3-7 can be performed for any type of tree including trees that represent specifications for APIs including but not limited to web APIs. In FIG. 4, blocks 403, 405, and 407 are not necessary. The merging criteria at block 617 can comprise that a node and/or path is common in the API trees. The operations in FIG. 6 can be performed without reference to an index that counts multiplicity of nodes. The operations in FIG. 7 can be performed for any traffic indicating URI paths or other types of paths that comprise location identifiers of resources, and the merged API tree in FIG. 7 can be generated based on common paths and/or nodes in batches of API trees generated from application traffic. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
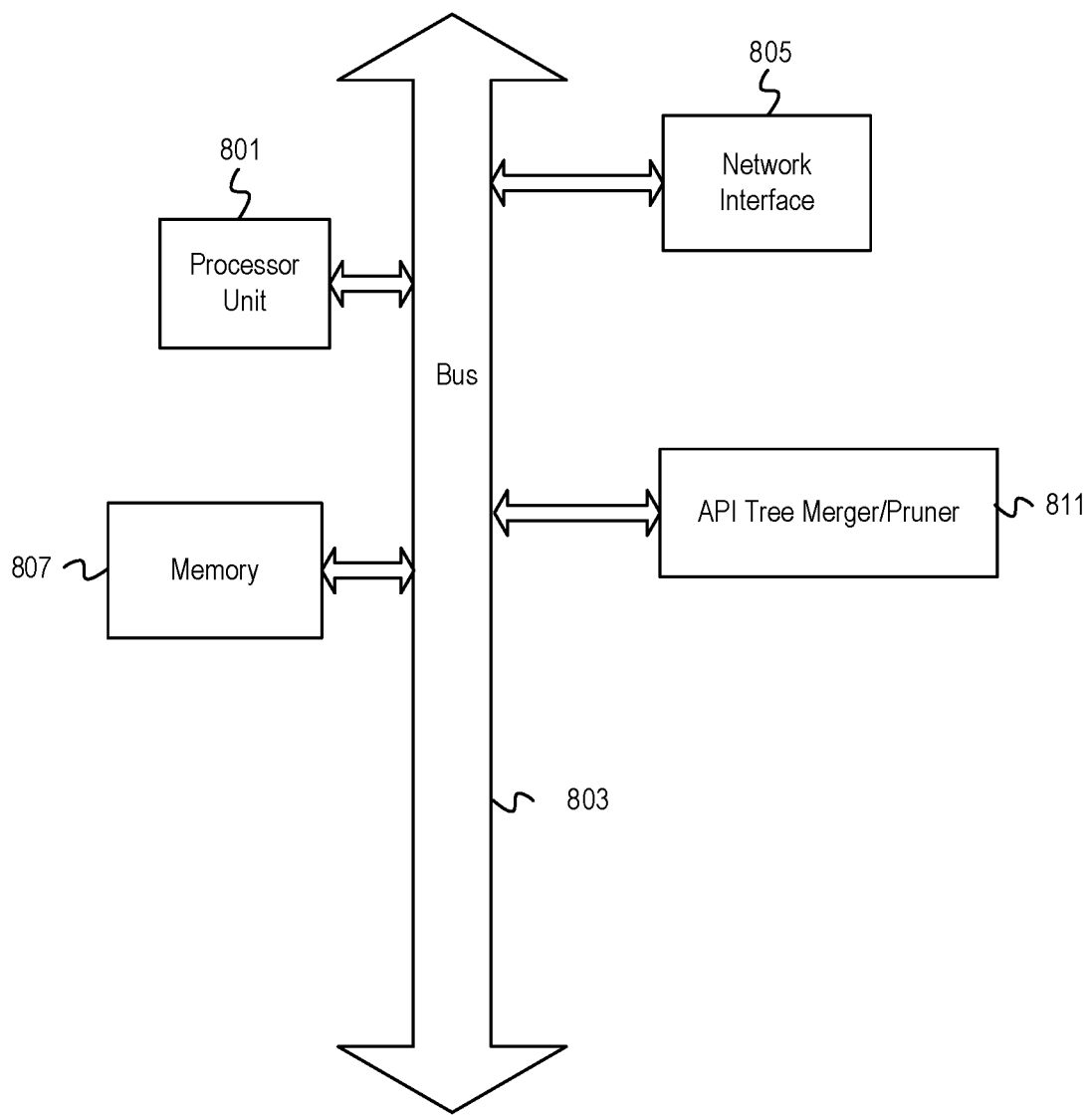
FIG. 8 depicts an example computer system with an API tree merger/pruner.

FIG. 8 depicts an example computer system with an API tree merger/pruner. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes an API tree merger/pruner 811. The API tree merger/pruner 811 can merge, prune, and compact API trees generated from application traffic communicated by an application to an API agent running on a cybersecurity appliance. The cybersecurity appliance can implement an updated API tree on the API agent based on merged/pruned/compacted API trees generated by the API tree merger/pruner 811. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for updating API trees using merged/compacted/ pruned application traffic as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
generating a first plurality of trees from first application traffic based on paths indicated in packets of the first application traffic which correspond to an application programing interface (API), wherein each of the paths indicated in the packets of the first application traffic correspond to a Uniform Resource Identifier (URI) path;
generating a first merged tree as a specification for the API, wherein generating the first merged tree comprises,
detecting one or more malicious paths of the first plurality of trees that correspond to malicious behavior in second application traffic;
removing the one or more malicious paths from the first plurality of trees; and
merging at least one of common paths and common nodes in the first plurality of trees; and
filtering the second application traffic corresponding to the API with the first merged tree.

2. The method of claim 1, wherein generating the first merged tree as a specification for the API further comprises,
determining whether nodes of the first plurality of trees indicate same or similar content; and
compacting at least one of the nodes and corresponding paths determined as indicating same or similar content.

3. The method of claim 2, wherein compacting at least one of the nodes and corresponding paths comprises replacing at least one of a plurality of nodes and a plurality of paths with, respectively, a representative node and a path of representative nodes in a tree structure of the first plurality of trees.

4. The method of claim 1, wherein the common paths and common nodes comprise paths and nodes, respectively, with a frequency of matches in the first plurality of trees above a threshold frequency.

5. The method of claim 4, wherein the matches of paths and nodes in the first plurality of trees comprise exact matches of at least one of corresponding labels and corresponding content.

6. The method of claim 1, wherein the common paths and common nodes comprise paths and nodes occurring above a threshold number of paths and a threshold number of nodes, respectively.

7. The method of claim 1, wherein filtering the second application traffic with the first merged tree comprises,
Extracting URI paths from packets in the second application traffic; and
based on determining that a URI path fora first packet of the packets in the second application traffic does not correspond to a path in the first merged tree, filtering the first packet from the second application traffic.

8. The method of claim 1, wherein generating the first merged tree as a specification for the API comprises,
determining that a first path or first node in the first plurality of trees satisfies merging criteria, wherein the merging criteria at least includes that the first path or first node is common in the first plurality of trees; and
based on the determining that the first path or first node satisfies the merging criteria, adding the first path or first node to the first merged tree.

9. An apparatus comprising:
a processor; and
a non-transitory computer-readable medium having instructions stored thereon that are executable by the processor to cause the apparatus to:
generate a first plurality of trees from first application traffic based on paths indicated in packets of the first application traffic which correspond to an application programing interface (API), wherein each of the paths indicated in the packets of the first application traffic correspond to a Uniform Resource Identifier (URI);
generate a first merged tree as a specification for the API, wherein the instructions to generate the first merged tree comprise instructions to,
detect one or more malicious paths of the first plurality of trees that correspond to malicious behavior in second application traffic;
remove the one or more malicious paths from the first plurality of trees; and
merge at least one of common paths and common nodes in the first plurality of trees;
and
filter the second application traffic corresponding to the API with the first merged tree.

10. The apparatus of claim 9, wherein the instructions executable by the processor to cause the apparatus to generate the first merged tree as a specification for the API further comprise instructions to,
determine whether nodes of the first plurality of trees indicate same or similar content; and
compact at least one of the nodes and corresponding paths determined as indicating same or similar content.

11. The apparatus of claim 9, wherein the common paths and common nodes comprise paths and nodes, respectively, with a frequency of matches in the first plurality of trees above a threshold frequency.

12. The apparatus of claim 11, wherein the matches of paths and nodes in the first plurality of trees comprise exact matches of at least one of corresponding labels and corresponding content.

13. The apparatus of claim 9, wherein the common paths and common nodes comprise paths and nodes occurring above a threshold number of paths and a threshold number of nodes, respectively.

14. The apparatus of claim 9, wherein the instructions to filter the second application traffic with the first merged tree comprise instructions executable by the processor to cause the apparatus to,
extract URI paths from packets in the second application traffic; and
based on determining that a URI path fora first packet of the packets in the second application traffic does not correspond to a path in the first merged tree, filter the first packet from the second application traffic.

15. A non-transitory computer-readable medium having program code stored thereon that is executable by a computing device, the program code comprising instructions to:
  generate a first plurality of trees from first application traffic based on paths indicated in packets of the first application traffic which correspond to an application programing interface (API), wherein each of the paths indicated in the packets of the first application traffic correspond to a Uniform Resource Identifier (URI);
  generate a first merged tree as a specification for the API, wherein the instructions to generate the first merged tree comprise instructions to,
    detect one or more malicious paths of the first plurality of trees that correspond to malicious behavior in second application traffic;
    remove the one or more malicious paths from the first plurality of trees; and
    merge at least one of common paths and common nodes in the first plurality of trees; and
  filter the second application traffic corresponding to the API with the first merged tree.

16. The non-transitory computer-readable medium of claim 15, wherein the program code to generate the first merged tree as a specification for the API further comprises instructions to,
  determine whether nodes of the first plurality of trees indicate same or similar content; and
  compact at least one of the nodes and corresponding paths determined as indicating same or similar content.

17. The non-transitory computer-readable medium of claim 15, wherein the common paths and common nodes comprise paths and nodes, respectively, with a frequency of matches in the first plurality of trees above a threshold frequency.

18. The non-transitory computer-readable medium of claim 17, wherein the matches of paths and nodes in the first plurality of trees comprise exact matches of at least one of corresponding labels and corresponding content.

19. The non-transitory computer-readable medium of claim 15, wherein the common paths and common nodes comprise paths and nodes occurring above a threshold number of paths and a threshold number of nodes, respectively.

20. The non-transitory computer-readable medium of claim 15, wherein the program code to filter the second application traffic with the first merged tree comprises instructions to,
  extract URI paths from packets in the second application traffic; and
  based on determining that a URI path for a first packet of the packets in the second application traffic does not correspond to a path in the first merged tree, filter the first packet from the second application traffic.

* * * * *